2,924,761

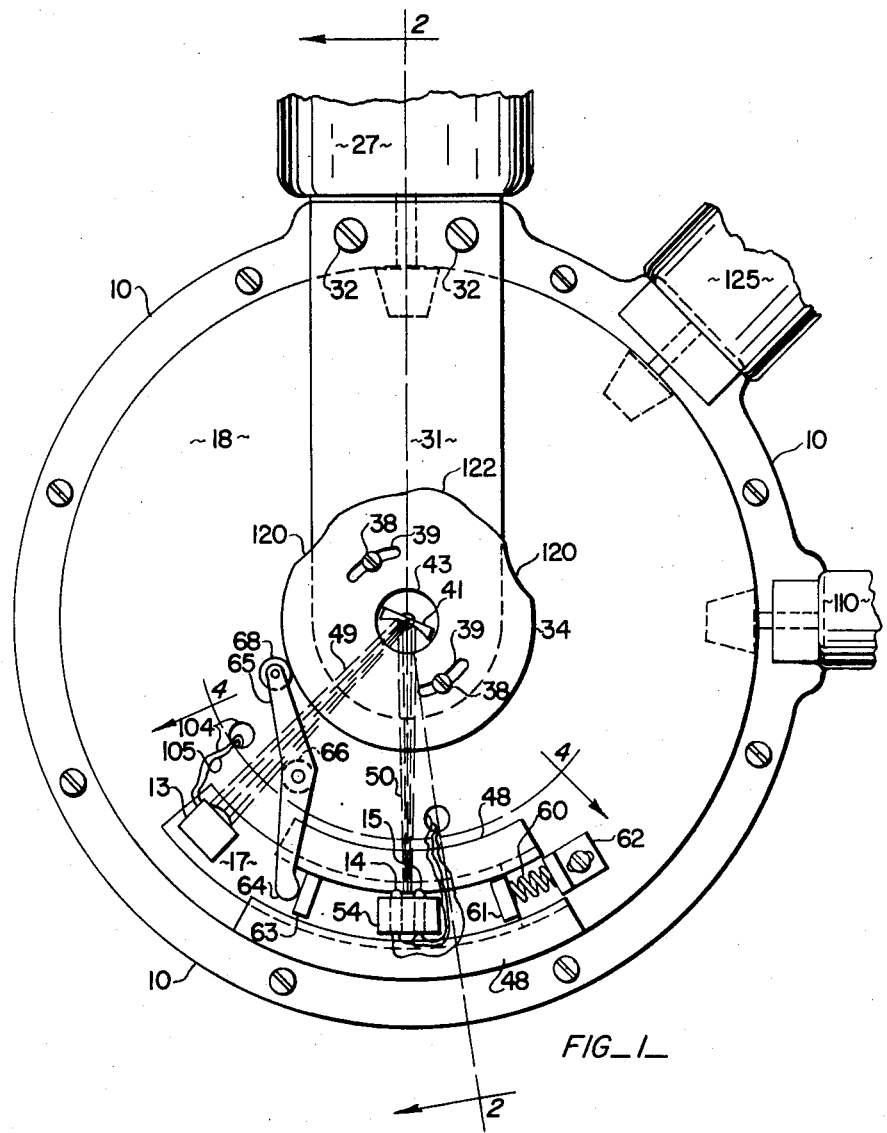
FIG_1_
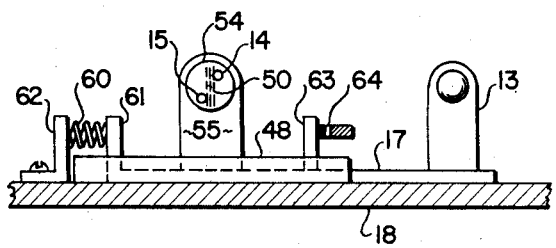
FIG_4_
INVENTORS
Joseph A. Kuhn, Jr.
Charles R. Upton
BY
D. Emmett Thompson
ATTORNEY Feb. 9, 1960 J. A. KUHN, JR., ET AL 2,924,761
SERVOSYSTEM FOR SELF-CALIBRATING PRECISION METERING APPARATUS
Filed Oct. 27, 1958 2 Sheets-Sheet 2
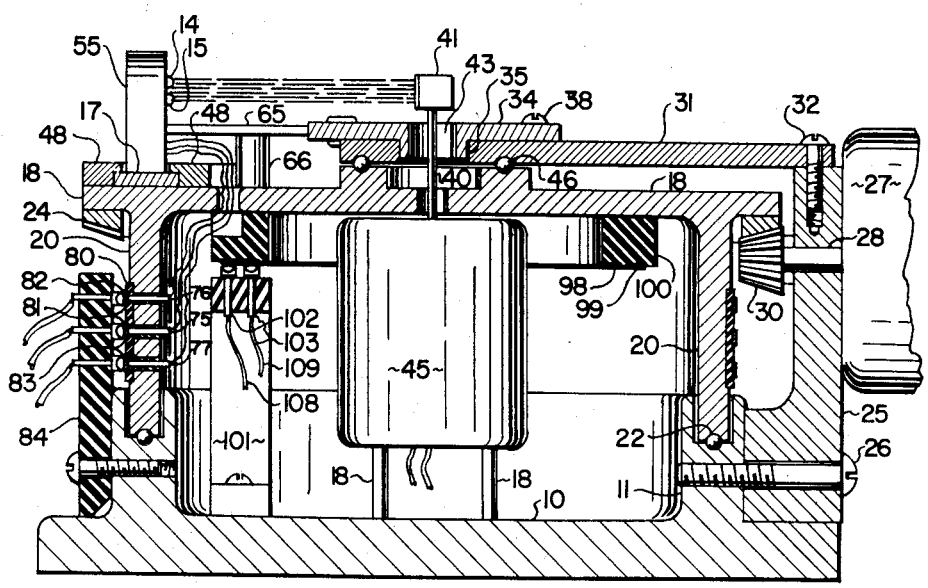
FIG_2_
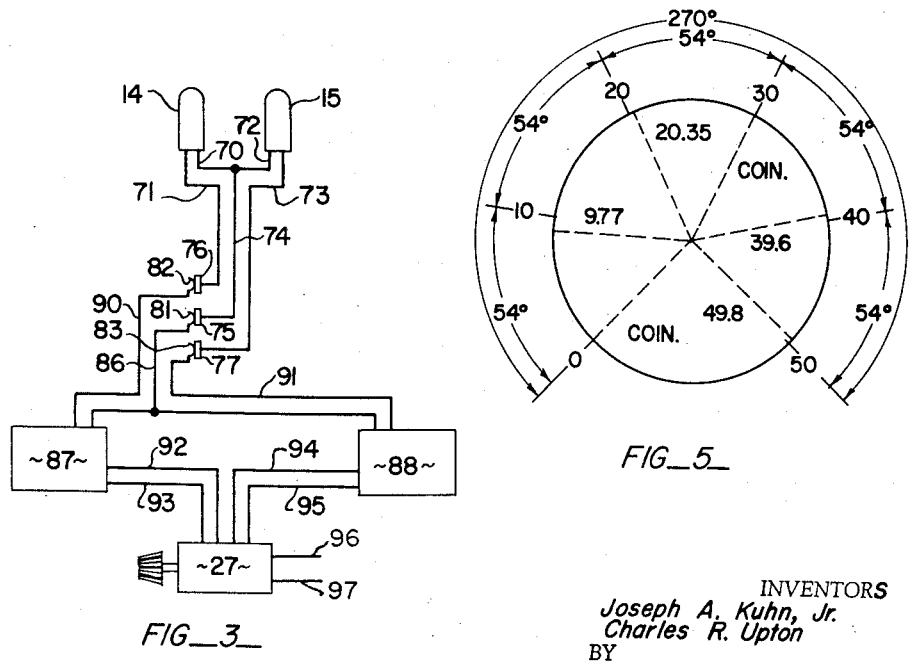
FIG_3_
FIG_5_
INVENTORS
Joseph A. Kuhn, Jr.
Charles R. Upton
BY
D. Emmett Thompson
ATTORNEY United States Patent Office 2,924,761
Patented Feb. 9, 1960

SERVOSYSTEM FOR SELF-CALIBRATING PRECISION METERING APPARATUS

Joseph A. Kuhn, Jr., and Charles R. Upton, Silver Spring, Md., assignors to Crouse-Hinds Company, Syracuse, N.Y., a corporation of New York Application October 27, 1958, Serial No. 769,860

5 Claims. (Cl. 318—31)

This invention relates to metering apparatus, and has as an object metering apparatus wherein an indicating element is operated by a separate power unit which is responsive to deflection of a meter movement through a light beam control, and embodying means for automatically compensating for any inaccuracy inherent in the meter movement.

The invention consists in the novel features and in the combinations and constructions hereinafter set forth and claimed.

In describing this invention, reference is had to the accompanying drawings in which like characters designate corresponding parts in all the views.

In the drawings—

Figure 1 is a top plan view of a metering apparatus embodying our invention.

Figure 2 is a sectional view taken on line 2—2, Figure 1.

Figure 3 is a schematic diagram of the control circuit.

Figure 4 is a view taken on line 4—4, Figure 1.

Figure 5 is a hypothetical linear scale of an electrical meter wherein minor errors of indications appear.

The invention consists generally of a frame in which an instrument movement is mounted and which has affixed to its staff a small mirror. A supporting member is mounted in the frame for movement in a circular path about the axis of the instrument movement staff. A reversible motor drive is provided for operating the supporting member in opposite directions. The motor drive is controlled by a system including a light source for directing a light beam on the mirror, and a pair of light sensitive cells mounted on the supporting member. The arrangement is such that when the supporting member is positioned coincident with the mirror with instrument registry at "O," a light beam reflected from the mirror is impinged equally upon the photo cells. Upon movement of the mirror, a differential energization of the photo cells occurs as the light beam to one of the cells is diminished, or discontinued. This results in the energization of the motor drive providing a follow-up mechanism to move the supporting member in the direction of the movement of the mirror. This movement continues until the light sensitive cells are brought into the beam reflected from the mirror to effect a balanced impingement of light upon the photo cells, whereupon the motor drive is stopped.

The apparatus further includes a correction means which is operable to effect fine adjustment of the position of the supporting member relative to the position of the mirror to compensate for any inaccuracies inherent in the meter movement, or to provide for an indicating scale different from that effected by the meter instrument as linear, non-linear, logarithmic, etc.

In the structural arrangement shown in the drawings, the apparatus consists of a base 10 having an upstanding cylindrical portion 11, the supporting member carrying the light source 13 and the photo cells 14, 15, is in the form of a slide 17 mounted upon a disk 18. The disk 18 is formed with a depending cylindrical flange 20, the lower edge of which is positioned in a circular groove formed in the portion 11 of the base member and is journalled on balls 22 to provide an anti-friction bearing support.

A ring gear 24 is affixed to the under side of the disk 18 adjacent the periphery thereof. A bracket 25 is mounted upon the base 10, as by screws 26. A reversible motor 27 is mounted upon the bracket 25 and there is affixed to the output shaft 28 of the motor a pinion gear 30 arranged in mesh with the ring gear 24. The gearing 24, 30, is of the precision type not having any back lash. The reversible motor 27 serves to effect rotation of the supporting plate 18 about a vertical axis.

A cam supporting plate 31 is fixedly secured at one end to the upper end of the bracket 25, as by screws 32. A cam plate 34 is mounted upon the upper surface of the plate 31 and is formed with a depending hub 36 mounted in an aperture in the plate 31. The cam 34 is secured to the plate 31, as by screws 38, extending through arcuate slots 39 formed in the cam, the screws threading into the plate 31.

The cam 34 is formed on its under side with a cylindrical flange 36 positioned in a cylindrical aperture in the plate 31. This arrangement serves to properly center the cam during adjustment thereof afforded by the arcuate slots 39 and screws 38. The cam 34 is centrally apertured at 43 to receive the staff 40 of the instrument 45 and this aperture is preferably of a diameter to permit the cam plate to be moved upwardly over the mirror 41 affixed to the upper end of the staff 40 to effect removal and replacement of the cam plate.

An annular series of balls 46 is positioned in annular grooves in the confronting surfaces of the supporting disk 18 and the plate 31 to provide an anti-friction upper bearing for the supporting disk 18.

The arcuate slide 17 is mounted on the upper surface of the supporting disk 18 between arcuate shaped gib members 48. The light source 13 is affixed to the slide 17 and functions to project a beam 49 of light on the mirror 41. The mirror 41 is of the astigmatic cylindrical type and it functions to reflect a beam 50 which is impinged equally upon photo electric cells 14 and 15 mounted in a cylindrical carrier 54.

The carrier 54 is rotatably mounted in the support 55 fixed to the slide 17. With this arrangement, the carrier 54 is rotated about an axis extending parallel with the reflected beam 50 and whereby the cells may be positioned to receive equal distribution of the beam 50.

A compression spring 60 is interposed between a flange 61 turned upwardly at one end of the slide 17 and an abutment 62 secured to the disk 18, whereby the slide is yieldingly urged in a clockwise direction relative to the disk 18, see Figure 1. The slide is formed with a second upstanding abutment 63 for engagement by the free end 64 of a lever 65 pivoted on a stud 66 secured to the disk 18. The opposite end of the lever 65 is provided with a roller 68 engaging the periphery of the cam 34.

Leads 70, 71, are connected to the photo cell 14, and leads 72, 73, are connected to the photo cell 15. The leads 70, 72, are connected to a wire 74 which, in turn, is connected to a slip ring 75. The lead 71 is connected to a slip ring 76, and the lead 73 is connected to a slip ring 77. The slip rings 75, 76, 77, are carried by an insulating sleeve 80 secured to the exterior of the cylindrical flange 20 of the supporting disk 18. Brushes 81, 82 and 83, carried by an insulating block 84, bear respectively upon the slip rings 75, 76, 77, see Figure 2. The brush 81 is connected by wire 86 to amplifiers 87, 88. The brush 82 is connected by wire 90 to amplifier 87, and the brush 83 is connected by wire 91 to the amplifier 88. The output of amplifier 87 is connected to the reversible motor 27 by wires 92, 93. The output of the amplifier 88 is connected by wires 94, 95, to the motor 27. The main supply to the motor is indicated at 96, 97. Normally, that is when the supporting disk 18 is positioned coincident with the position of the mirror 41, the light beam 50 is impinged equally upon the cells 14, 15, establishing a balanced condition wherein the amplifiers 87, 88, have no output to the motor 27. When the beam 50 is shifted by movement of the mirror 41 to diminish, or discontinue, impingement upon one of the photo cells, power is supplied to the motor 27 to effect rotation of the disk 18 in the direction in which the mirror has been moved by the instrument 45.

Slip rings 98, 99, are mounted upon an annular insulating member 100 secured to the under side of the supporting disk 18. A block of insulating material 101 is mounted upon the base 10 and carries brushes 102, 103, contacting the slip rings 98, 99. The slip rings 98, 99, are connected by leads 104, 105, to the light source 13. This arrangement provides a supply of current to the light source from conductors 108, 109.

To provide for on-the-sight indication of the position of the supporting disk 18, a counter 110 is connected to the disk 18 by a pinion gear 111 meshing with the ring gear 24. This counter is of the standard type commonly employed to provide a numerical indication according to the angular movement of its shaft which, in turn, is actuated by the angular movement of the disk 18. One type of such counter is known as the Veeder Root counter.

The instrument 45 may be of any type for indicating a change in a medium—for example, it may be of the electrical type for indicating voltage, current, etc., or the pressure type for indicating pressure on a medium, or the temperature type, etc.

It is not feasible to manufacture instruments commercially which function with high accuracy. For example, in electrical meters, an indication of plus or minus two percent is considered to be an instrument of high quality. The function of the cam 34, the follower 65 and the movable slide 17, is to provide for the giving of an indication of extreme accuracy. Referring to Figure 5, the dotted radial lines indicate the position of the pointer of a high grade commercial instrument. It will be seen that when a value of 10 is impressed upon the instrument, the pointer actually reads 9.77, or slightly below the accurate 10 graduation. When a value of 20 is impressed upon the instrument, the pointer reads 20.35. In this instance, the pointer has over-traveled. When a value of 30 is impressed upon the instrument, the pointer is in register with the 30 graduation. Likewise, when values of 40 and 50 are impressed upon the instrument, the pointer does not indicate the precise value.

The purpose of the cam 34, follower 65, and the movable slide 17, is to provide a correction apparatus so that the indication given by the metering apparatus will be precise notwithstanding any inherent deficiency, or defect, in the instrument.

A known value is applied to the instrument 45 and the position of the support disk 18 noted by reference to the on-the-sight counter 110. If the instrument has not moved in precise relation to the value impressed upon it, such deficiency and the extent thereof, will be obvious from the counter 110. By calculation, the contour of the periphery of the cam 34 to adjust the movement of the disk 18 can be determined. For example, the cam periphery may need to be formed with a depression or valley 120, Figure 1, or a portion of the cam, such as 122, may need to be raised to provide a lobe. In this manner, the entire periphery of the cam can be calculated to effect an accurate positioning of the disk 18 dependent upon the values impressed upon the instrument 45.

A resolver or converter 125 may be also connected through gearing to the disk 18 for converting to digital the angular position of the disk 18 having output circuitry available to provide coded transmission for telemetering purposes where it is desirable to provide readings of the apparatus at distant stations.

What we claim is:

1. Precision metering apparatus of the type described comprising a frame, an indicating instrument mounted on the frame, a support member journalled for rotation on said frame, a light source and a pair of light sensitive cells carried by said support member, said instrument having light directing means for directing said light beam for equal impingement on said cells when said cells and said means carried by the instrument are positioned coincident, said light directing means being rotatable on said axis by said instrument in response to said instrument sensing a change in the condition of a medium, a reversible motor drive operatively connected to said support member for effecting rotation thereof in opposite directions, control means for said reversible motor drive including said light sensitive cells and being operable by differential energization of said cells when the light beam of one of said cells is diminished, or discontinued, upon movement of said light directing means by said instrument to energize said reversible motor drive to effect movement of said support member corresponding to the movement of said light directing means, and corrective means operable to effect movement of said light source and said cells on said support member to adjust the position thereof relative to the position of said light directing means to compensate for any inaccuracies in said instrument.

2. Precision metering apparatus comprising a frame, an indicating instrument mounted on the frame, a mirror rotatable about an axis by said instrument in response to said instrument sensing a change in the condition of a medium, a support member journalled in the frame for rotation about said axis, a light source and a pair of light sensitive cells carried by said support member, said light source projecting a beam of light on said mirror, and said mirror reflecting said beam for equal impingement on said cells when said cells and mirror are positioned coincident, a reversible motor drive operatively connected to said support member for effecting rotation thereof in opposite directions, control means for said reversible motor drive including said light sensitive cells and being operable by differential energization of said cells when the light beam to one of said cells is diminished, or discontinued, upon movement of said mirror by said instrument to energize said reversible motor drive to effect movement of said support member corresponding to the movement of said mirror, and corrective means operable to effect movement of said light source and said cells on said support member to adjust the position thereof relative to the position of said mirror to compensate for any inaccuracies in said instrument.

3. Precision metering apparatus comprising a frame, an indicating instrument mounted on the frame, a mirror rotatable about an axis by said instrument in response to said instrument sensing a change in the condition of a medium, a support member journalled in the frame for rotation about said axis, a light source and a pair of light sensitive cells carried by said support member, said light source projecting a beam of light on said mirror, and said mirror reflecting said beam for equal impingement on said cells when said cells and mirror are positioned coincident, a reversible motor drive operatively connected to said support member for effecting rotation thereof in opposite directions, control means for said reversible motor drive including said light sensitive cells and being operable by differential energization of said cells when the light beam to one of said cells is diminished, or discontinued, upon movement of said mirror by said instrument to energize said reversible motor drive to effect movement of said support member corresponding to the movement of said mirror, cam actuated means operable to effect movement of said light source and said cells in a circumferential direction on said support member to adjust the position thereof relative to the position of said mirror to compensate for any inaccuracies in said instrument.

4. Precision metering apparatus of the type described comprising a frame, an indicating instrument mounted on the frame, a mirror rotatable about an axis by said instrument in response to said instrument sensing a change in the condition of a medium, a support member journalled in the frame for rotation about said axis, a slide mounted upon said support member for movement thereon in a circumferential direction, a light source and a pair of light sensitive cells carried by said slide, said light source projecting a beam of light on said mirror and said mirror reflecting said beam for equal impingement upon said cells when said cells and mirror are positioned coincident, a reversible motor drive operatively connected to said support member for effecting rotation thereof in opposite directions, control means for said reversible motor drive including said light sensitive cells and being operable by differential energization of said cells when said light beam to one of said cells is diminished, or discontinued, upon movement of said mirror by said instrument to energize said reversible drive to effect movement of said support member corresponding to the movement of said mirror, means operatively connected to said support member for indicating the position thereof, a cam fixedly mounted on the frame, a cam follower mounted on said support member, said cam and follower being cooperable to effect movement of said slide on said support to adjust the position of said support member relative to the position of said mirror to compensate for any inaccuracies inherent in said instrument.

5. Precision metering apparatus of the type described comprising a frame, an indicating instrument mounted on the frame, a support member journalled for rotation on said frame, a light source emitting a beam, a pair of light sensitive cells carried by said support member, said instrument having light directing means for directing said light beam for equal impingement on said cells when said cells and said means carried by the instrument are positioned coincident, said light directing means being rotatable on said axis by said instrument in response to said instrument sensing a change in the condition of a medium, a reversible motor drive operatively connected to said support member for effecting rotation thereof in opposite directions, control means for said reversible motor drive including said light sensitive cells and being operable by differential energization of said cells when the light beam of one of said cells is diminished, or discontinued, upon movement of said light directing means by said instrument to energize said reversible motor to effect movement of said support member corresponding to the movement of said light directing means, and corrective means operable to effect movement of said cells of said support member to adjust the position thereof relative to the position of said light directing means to compensate for any inaccuracies in said instrument.

No references cited.